United States Patent
Tamayama

(10) Patent No.: US 6,618,089 B1
(45) Date of Patent: Sep. 9, 2003

(54) DISPLAY APPARATUS AND ELECTRONIC CAMERA

(75) Inventor: Hiroshi Tamayama, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/315,125

(22) Filed: May 20, 1999

(30) Foreign Application Priority Data

May 22, 1998 (JP) .......................................... 10-141147

(51) Int. Cl.[7] .............................................. H04N 5/222
(52) U.S. Cl. ............................. 348/333.13; 348/231.99; 345/212
(58) Field of Search .................... 348/207.99, 220.1, 348/222.1, 231.99, 333.01, 333.11, 333.12, 333.13, 372, 231.6, 375; 345/211, 212, 213, 214, 8

(56) References Cited

U.S. PATENT DOCUMENTS 5,561,462 A * 10/1996 Nagano ....................... 348/372
5,635,948 A * 6/1997 Tonosaki ....................... 345/8
6,346,937 B1 * 2/2002 Sasaki et al. ................ 345/211

* cited by examiner

Primary Examiner—Tuan Ho
(74) Attorney, Agent, or Firm—Birch, Stewart, Kolasch & Birch, LLP

(57) ABSTRACT

An electronic camera that reduces the consumption of electricity when an image is displayed on an LCD and is able to perform other signal processing at a high speed. Image data captured through an imaging unit is stored in an image memory and is then read from the image memory continuously or intermittently to an LCD drive circuit through a signal processing circuit and a video output circuit. While no video signal is applied in the case that the video signal is intermittently read, the LCD drive circuit suspends applying of drive pulses to the LCD and maintains a currently-displayed image on the LCD. On the other hand, while no image data is read from the image memory in the case that the image data is intermittently read from the image memory for the display on the LCD, the image memory can be freely accessed to perform other signal processing such as recording the image data into an external storage medium.

18 Claims, 3 Drawing Sheets

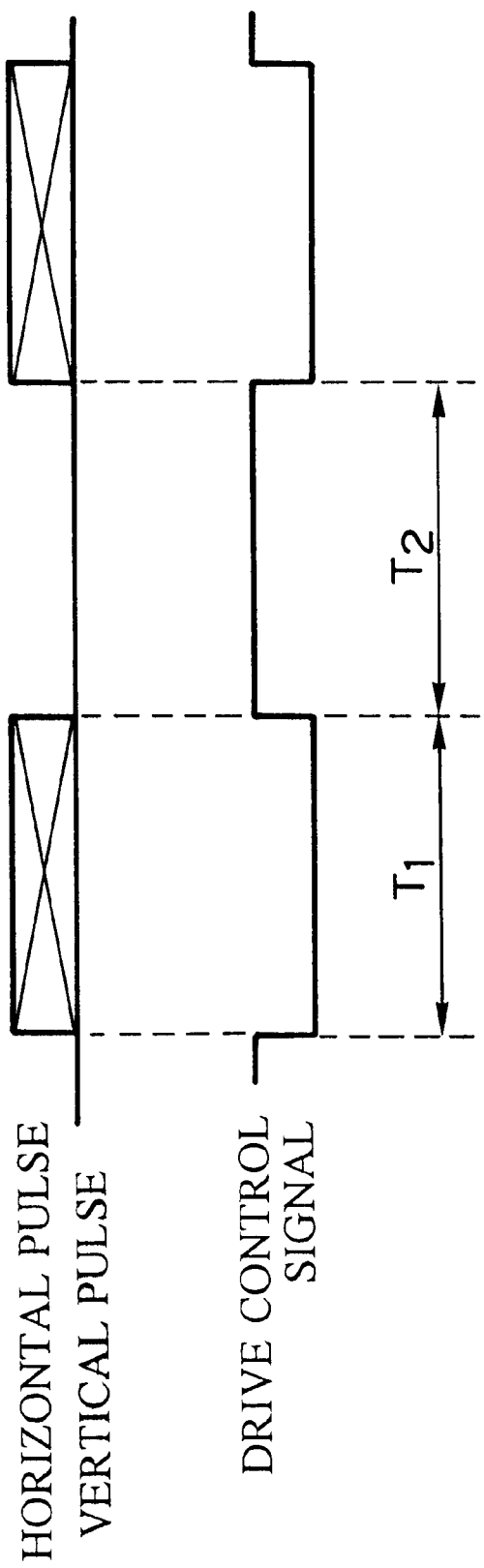

DISPLAY APPARATUS AND ELECTRONIC CAMERA

BACKGROUND OF THE INVENTION

1. Field of the Invention

The present invention relates generally to a display apparatus and an electronic camera, and more particularly to an LCD apparatus, which is applied to an electronic camera such as a digital camera, and an electronic camera.

2. Description of Related Art

Conventionally, to display a still image captured by a digital camera, etc. on a liquid crystal display (LCD), image data of the still image is stored in an image memory, the image data is then read from the image memory and converted into a standard video signal (e.g., NTSC or PAL) or a video signal suitable for the LCD. The video signal is applied to the LCD so that the still image can be displayed on the LCD.

During the display, the image memory is continuously accessed at a constant frame rate through a memory bus. Thus, in order to retrieve the image data from the image memory for another purpose of compressing the image data or recording the image data in an external storage medium, etc., it is necessary to stop the display temporarily or to retrieve the image data during only vertical and horizontal blanking periods.

If the display is temporarily stopped, it is impossible to confirm the image during that time. If the image data is retrieved during the vertical and horizontal blanking periods, it takes a long time to process the data as a whole, since the vertical and horizontal blanking periods are very short. For example, when an image of 640×480 pixels is displayed by means of the NTSC video signal, "One-frame period" =$\frac{1}{30}$=33.3 msec, and "Vertical blanking period" ="One-frame period" ×(525−480)/525=($\frac{1}{30}$)× $\frac{45}{525}$≅2.86 msec.

That is, if only the vertical blanking periods are used, the data is processed for only 2.86msec in each vertical synchronous period. Even if the horizontal blanking periods are also used, the processing time increases only a little.

There is proposed an electronic camera with an LCD monitor, which can also serve as an electronic finder for enabling a user to determine what will be included in the picture by displaying moving images captured through an imaging unit of the camera. This electronic camera, however, has a problem of consuming a large amount of electricity during the use of the LCD monitor.

SUMMARY OF THE INVENTION

It is an object of the present invention to provide a display apparatus and an electronic camera that reduce the consumption of electricity while an image is displayed on a display unit.

It is another object of the present invention to provide an electronic camera, which is capable of performing a signal processing at a high speed while displaying an image on the display unit.

To achieve the above-mentioned object, the present invention is directed to a display apparatus comprising: a display unit; a video signal generator for intermittently outputting a video signal; and a display unit driver for intermittently receiving the video signal from the video signal generator and applying the video signal and drive pulses to the display unit; wherein, while the display unit driver does not receive the video signal from the video signal generator, the display unit driver suspends applying of at least a part of the drive pulses to the display unit and maintains a currently-displayed image on the display unit.

To achieve the above-mentioned object, the present invention is also directed to an electronic camera comprising: an imaging device for converting light from a subject into an image signal; an imaging unit for obtaining image data representing the subject by driving the imaging device; a display unit; a video signal generator for controlling the imaging unit to intermittently drive the imaging device, intermittently converting the image data obtained through the imaging device and the imaging unit into a video signal, and intermittently outputting the video signal; and a display unit driver for intermittently receiving the video signal from the video signal generator and applying the video signal and drive pulses to the display unit; wherein, while the display unit driver does not receive the video signal from the video signal generator, the display unit driver suspends applying of at least a part of the drive pulses to the display unit and maintains a currently-displayed image on the display unit.

To achieve the above-mentioned object, the present invention is directed to an electronic camera comprising: an imaging device for converting light from a subject into an image signal; an imaging unit for obtaining image data representing the subject by driving the imaging device; an image memory for storing the image data; a display unit; a video signal generator for intermittently reading the image data from the image memory, intermittently converting the image data read from the image memory into a video signal, and intermittently outputting the video signal; and a display unit driver for intermittently receiving the video signal from the video signal generator and applying the video signal and drive pulses to the display unit; wherein, while the display unit driver does not receive the video signal from the video signal generator, the display unit driver suspends applying of at least a part of the drive pulses to the display unit and maintains a currently-displayed image on the display unit.

The display unit may comprise an LCD.

The present invention has been developed in view of the fact that some kinds of display units including the LCD can continue displaying the image for a constant period by applying voltage corresponding to the image data to each element between the terminals thereof, even if the application of the video signal and the drive pulses is suspended. According to the present invention, the video signal is intermittently applied to the display unit. While no video signal is applied, the drive pulse for the display unit is not generated, and the display unit continues displaying the currently-displayed image. It is therefore possible to stop driving the imaging device and stop reading the image data from the image memory while no video signal is applied. This significantly reduces the consumption of electricity. Stopping driving the display unit has no problem if the display unit displays a still image. If the display unit displays a moving image, the moving image is displayed intermittently and cannot be displayed smoothly, but the display unit LCD can satisfactorily serve as the electronic finder.

To achieve the above-mentioned object, the present invention is directed to an electronic camera comprising: an imaging device for converting light from a subject into an image signal; an imaging unit for obtaining image data representing the subject by driving the imaging device; an image memory for storing the image data; a display unit; a video signal generator for intermittently reading the image data from the image memory, intermittently converting the image data read from the image memory into a video signal, and intermittently outputting the video signal, the video signal generator being capable of continuously reading the image data from the image memory, continuously converting the image data read from the image memory into the video signal, and continuously outputting the video signal; a signal processor for accessing the image memory to perform a signal processing while the video signal generator does not read the image data from the image memory; and a display unit driver for intermittently receiving the video signal from the video signal generator and applying the video signal and drive pulses to the display unit; wherein, while the display unit driver does not receive the video signal from the video signal generator, the display unit driver suspends applying of at least a part of the drive pulses to the display unit and maintains a currently-displayed image on the display unit.

According to the present invention, in the case of performing a signal processing (e.g., compressing the image data and recording the image data in the external storage medium) during the image data is read from the image memory for the display on the display unit, the image data is intermittently read from the image memory and the display unit is intermittently driven. Thus, the image data is not always read from the image memory for the display on the display unit. For this reason, it is possible to secure enough time to perform other signal processing using the image data in the image memory and perform the signal processing at a high speed.

Preferably, the electronic camera further comprises: a video output terminal for operatively connecting to an external device, the video signal outputted from the video signal generator being outputted to the external device through the video output terminal; and a detector for detecting the video output terminal operatively connecting the external device; wherein, when the detector detects the video output terminal operatively connecting the external device, the video signal generator continuously reads the image data from the image memory, continuously converts the image data read from the image memory into the video signal, and continuously outputs the video signal.

According to the present invention, if the video output terminal connects to the external device such as a television, the video signal is outputted continuously, not intermittently, since it is necessary to output the standard (not intermittent) video signal of NTSC or PAL etc. to the external device through the video output terminal.

Preferably, in the electronic camera, the signal processor performs the signal processing including recording the image data stored in the image memory into a storage medium; and the video signal generator intermittently reads the image data from the image memory since a release of the electronic camera is operated until the image data is recorded in the storage medium.

To achieve the above-mentioned object, the present invention is directed to an electronic camera comprising: imaging device for converting light from an object into an image signal; imaging means for acquiring image data representing the object by driving the imaging device; a liquid crystal display (LCD); a video output terminal for outputting video signals to outside; selection means for selecting whether to output the video signals through the video output terminal or to display an image on the LCD; timing signal generating means for generating a first timing signal suitable for generating standard video signals if the selection means selects outputting the video signals and generating means generating a second timing signal with a lower frequency than the first timing signal if the selection means selects displaying the image on the LCD; video signal generator for controlling the imaging means to drive the imaging device with the first timing signal if the selection means selects outputting the video signals, converting the image data acquired through the imaging device and the imaging means into the standard video signals, and outputting the standard video signals; and LCD driving means for driving the imaging means to drive the imaging device with the second timing signal if the selection means selects displaying the image on the LCD, converting the image data acquired through the imaging device and the imaging means into video signals suitable for display on the LCD, and outputting the video signals and drive pulses corresponding to the video signals to the LCD.

To achieve the above-mentioned object, the present invention is also directed to an electronic camera comprising: an imaging device for converting light from a subject into an image signal; an imaging unit for obtaining image data representing the subject by driving the imaging device; a display unit; a video output terminal for operatively connecting to an external device; a selector for selecting one of a first mode to output a first video signal to the external device through the video output terminal and a second mode to display an image represented with the image data on the display unit; a timing signal generator for generating, in the first mode, a first timing signal to generate the first video signal, and generating, in the second mode, a second timing signal with a lower frequency than the first timing signal; a video signal generator for, in the first mode, controlling the imaging unit to drive the imaging device with the first timing signal, converting the image data obtained through the imaging device and the imaging unit into the first video signal, and outputting the first video signal; and a display unit driver for, in the second mode, controlling the imaging unit to drive the imaging device with the second timing signal, converting the image data obtained through the imaging device and the imaging unit into a second video signal, and applying the second video signal and drive pulses to the display unit.

To achieve the above-mentioned object, the present invention is also directed to an electronic camera comprising: an imaging device for converting light from a subject into an image signal; an imaging unit for obtaining image data representing the subject by driving the imaging device; an image memory for storing the image data; a display unit; a video output terminal for operatively connecting to an external device; a selector for selecting one of a first mode to output a first video signal to the external device through the video output terminal and a second mode to display an image represented with the image data on the display unit; a timing signal generator for generating, in the first mode, a first timing signal to generate the first video signal, and generating, in the second mode, a second timing signal with a lower frequency than the first timing signal; a video signal generator for, in the first mode, reading the image data from the image memory with the first timing signal, converting the image data read from the image memory into the first video signal, and outputting the first video signal; and a display unit driver for, in the second mode, reading the image data from the image memory with the second timing signal, converting the image data read from the image memory into a second video signal, and applying the second video signal and drive pulses to the display unit.

According to the present invention, if the video output terminal connects to the external device such as a television, the imaging device are driven or the image data is read from the image memory with the first timing signal suitable for generating the first or the standard video signal of NTSC or PAL etc., since it is necessary to output the standard video signal to the external device through the video output terminal. On the other hand, to perform the display on the display unit, it is unnecessary to confirm the format of the standard video signal. Thus, the imaging device is driven or the image data is read from the image memory with the second timing signal of the lower frequency than the first timing signal, and the second video signal for the display unit and the drive pulses corresponding to the video signal are generated. The consumption of electricity in each circuit is proportional to the frequency of the timing signal, with which the imaging device are driven and/or the image data is read from the image memory. For this reason, using the low frequency timing signal for the display on the display unit reduces the consumption of electricity.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a timing chart of a drive control signal in the LCD drive circuit.

DETAILED DESCRIPTION OF THE PREFERRED EMBODIMENT

This invention will be described in further detail by way of example with reference to the accompanying drawings.

Figure 1:
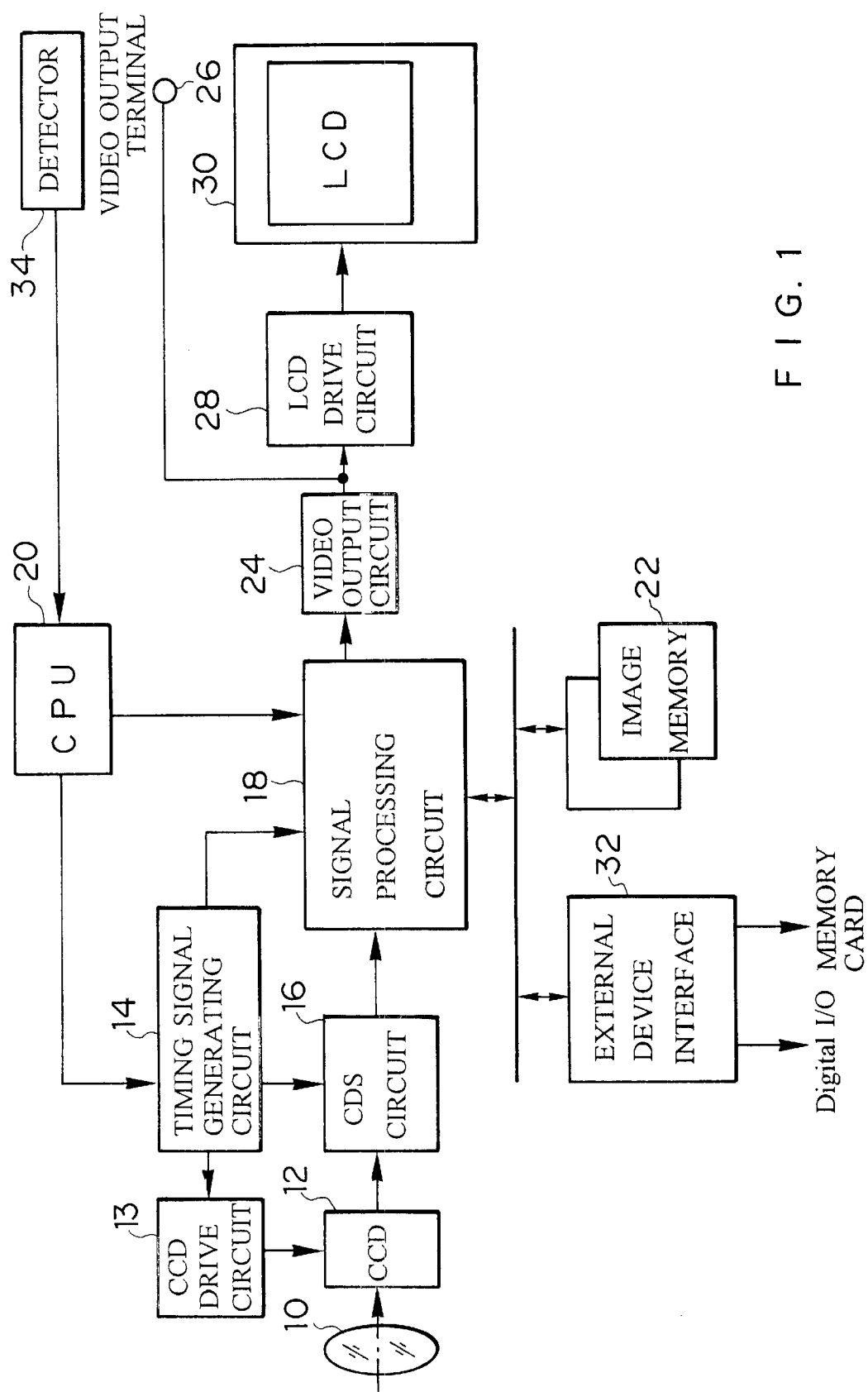
FIG. 1 is a block diagram showing an electronic camera according to an embodiment of the present invention.

FIG. 1 is a block diagram showing an electronic camera according to an embodiment of the present invention.

The electronic camera is a digital camera, which records still images in an external storage medium or a memory card, etc. in accordance with operations of a release button (not shown). The electronic camera has a liquid crystal display (LCD) 30, which is capable of displaying recorded still images or reproduced still images. The LCD 30 also serves as an electronic finder by displaying moving images captured through an imaging unit of the camera.

An image of the subject is formed on a light-receiving surface of a charge coupled device (CCD) 12 through a taking lens 10. The CCD 12 converts image light formed on the light receiving surface into signal electric charges corresponding to the quantity of the image light. The signal electric charges are sequentially read as a corresponding voltage signal or an image signal in accordance with CCD drive pulses applied from a CCD drive circuit 13. The voltage signal is transmitted to a CDS circuit 16.

The CDS circuit 16 includes a CDS clamp, a gain control amplifier and an A/D converter. The CDS clamp sample-holds the image signal, which is read from the CCD 12, and the gain control amplifier amplifies the image signal. Then, the A/D converter converts the image signal into an RGB digital video signal, and the RGB digital video signal is transmitted to a signal processing circuit 18. A timing signal generating circuit 14 outputs an appropriate timing signal to the CCD drive circuit 13, the CDS circuit 16 and the signal processing circuit 18 to synchronize these circuits. The timing signal will later be described in further detail.

The signal processing circuit 18 includes a YC signal generating circuit and a compression/expansion circuit. The signal processing circuit 18 converts the RGB digital video signal into a YC signal, which comprises a brightness signal Y and a chroma signal C, in accordance with a command from a central processing unit (CPU) 20, and stores the YC signal in an image memory 22. The signal processing circuit 18 reads the YC signal from the image memory 22 continuously or intermittently in accordance with a command from the CPU 20, and outputs the YC signal to a video output circuit 24.

The video output circuit 24 includes a D/A converter and an encoder. The video output circuit 24 converts the inputted YC signal into an analog signal with the D/A converter, and then converts the analog signal into a video signal (e.g., NTSC or PAL) with the encoder. The video output circuit 24 outputs the video signal to an LCD drive circuit 28, which generates an RGB video signal and drive pulses for the LCD 30 in accordance with the received video signal. The LCD drive circuit 28 applies the RGB video signal and the drive pulses to the LCD 30 in order to display an image on the LCD 30. The video output circuit 24 also outputs the video signal to a video output terminal 26, through which the video signal is outputted to an external device such as an external display. The CPU 20 connects to a detector 34, which mechanically or electrically detects whether or not the video output terminal 26 connects to the external device directly or through a cable, etc.

To record image data, the signal processing circuit 18 accesses the image memory 22 to retrieve the YC signal therein, and compresses the read YC signal in accordance with a command from the CPU 20. The signal processing circuit 18 records the compressed image data in the memory card through an external device interface 32, which transmits data between the signal processing circuit 18 and the memory card or an external device.

A description will be given of the case wherein a still image is recorded in the memory card by operating the release button. The image data, which is captured through the CCD 12 and the CDS circuit 16 when the release button is operated, is temporarily stored in the image memory 22. The signal processing circuit 18 intermittently reads the image data from the image memory 22 on a picture-by-picture basis (one field or one frame). More specifically, the signal processing circuit 18 reads the image data of one picture, and then, reads the image data of the next picture after a constant period (e.g., a period corresponding to one field or one frame).

Figure 2:
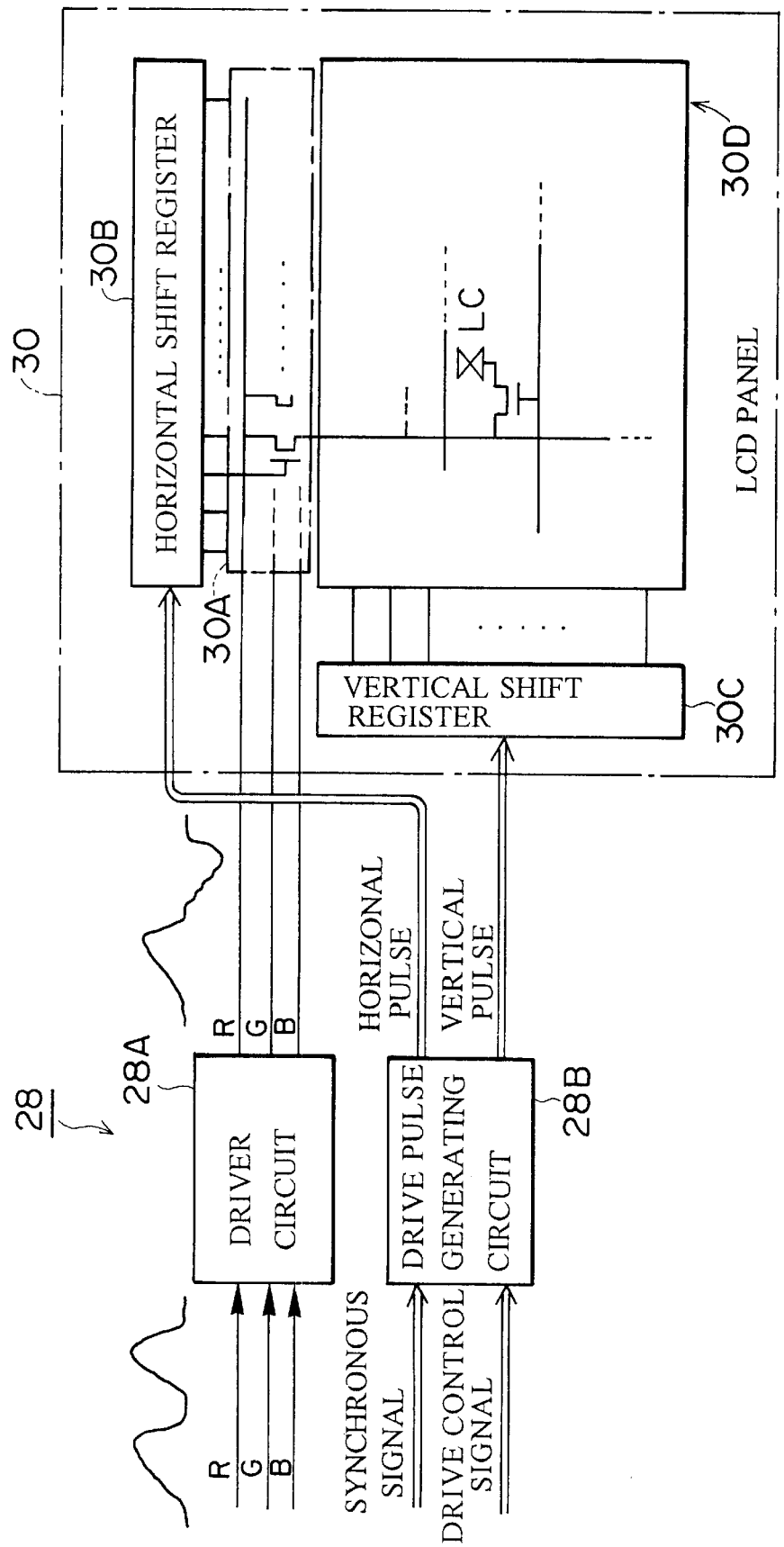
FIG. 2 is a block diagram showing an LCD drive circuit and the details of an LCD in FIG. 1.

The intermittently-read image data is converted into a video signal suitable for the LCD 30 through the video output circuit 24, and is applied to the LCD drive circuit 28. As shown in FIG. 2, the LCD drive circuit 28 comprises a driver circuit 28A, a drive pulse generating circuit 28B, and a circuit (not shown) for generating the RGB video signal, a synchronous signal and a drive control signal in accordance with the applied video signal. The RGB video signal is applied to the driver circuit 28A, and the synchronous signal and the drive control signal are applied to the drive pulse generating circuit 28B. The drive control signal represents whether the video signal is applied or not. As shown in FIG. 3, the drive control signal becomes a low level during a period $T_1$ in which the video signal is applied, and a high level during a period $T_2$ in which the video signal is not applied.

The driver circuit 28A applies the RGB video signal to a horizontal gate switch part 30A while inverting the polarity of the RGB video signal on a horizontal line-by-line basis in order to prevent constant voltages from being applied to liquid crystal elements in the LCD 30 for a long period.

The drive pulse generating circuit 28B generates horizontal pulses and vertical pulses for driving the LCD 30 in accordance with a vertical synchronous signal and a horizontal synchronous signal, which are synchronously separated from the video signal. During the drive control signal is on the high level as shown in FIG. 3 (during no video signal is applied), the drive pulse generating circuit 28B does not generate the horizontal pulses and the vertical pulses.

As shown in FIG. 2, the LCD 30 comprises the horizontal gate switch part 30A, a horizontal shift register 30B, a vertical shift register 30C, a display part 30D, in which the liquid crystal elements including capacity elements LC are arranged in a matrix. The horizontal gate switch part 30A receives the RGB video signal from the driver circuit 28A. The horizontal shift register 30B and the vertical shift register 30C receive the horizontal pulses and the vertical pulses, respectively, from the drive pulse generating circuit 28B.

The RGB video signal applied to the horizontal gate switch part 30A is captured into the horizontal shift register 30B, which is driven by the horizontal pulses. The vertical shift register 30C, which is driven by the vertical pulses, applies the RGB video signal to the liquid crystal elements on appropriate lines in the display part 30D. Each of the liquid crystal elements in the display part 30D modulates light that is transmitted through the element or reflected on the element in accordance with the applied voltage to display the image.

The drive pulse generating circuit 28B suspends the generation of the horizontal pulses and the vertical pulses during no video signal is applied. In this case, the electric charge corresponding to the image data is stored in the capacity element LC of each liquid crystal element in the display part 30D of the LCD 30, and thus, the voltage corresponding to the image data is kept being applied between terminals of each liquid crystal element. Consequently, the LCD 30 continues displaying the currently-displayed image even if neither the horizontal pulses nor the vertical pulses are applied. At that time, the image cannot be updated, but this is not a problem since the digital camera displays the still image.

Applying the constant voltage to the liquid crystal elements may deteriorate the liquid crystal elements. This problem can be solved by applying the constant voltage intermittently to drive the LCD 30 as shown in FIG. 3. It is also possible to prevent a flicker, etc. within a permissible level.

While no image data for the display on the LCD 30 is read from the image memory 22, a memory bus is opened so that the image memory 22 can be accessed freely. Thus, the signal processing circuit 18 accesses the image memory 22 to read and compress the YC signal therein, and records the compressed image data in the memory card through the external device interface 32.

Since the image data for the display on the LCD 30 is not always read from the image memory 22 (the image data is intermittently read from the image memory 22), it is possible to secure enough time for recording the image data stored in the image memory 22 into the memory card. In other words, it is possible to record the image data at a high speed without stopping the display on the LCD 30, and therefore, the next good opportunity to take an image will not be missed.

In this embodiment, the image data is read and the LCD 30 is driven intermittently on a picture-by-picture basis (one field or one frame), but it is also possible to intermittently read the image data and drive the LCD 30 on a line-by-line basis (1H or several H, where H is a horizontal scanning period).

The period $T_2$ in FIG. 3 may be equal to the period $T_1$ or more (e.g., a multiple period of $T_1$).

A description will be given of the second embodiment of the present invention. In the first embodiment, the image data is temporally stored in the image memory 22, and then, the image data is read from the image memory 22 so that the still image can be displayed on the LCD 30. In the second embodiment, the image data, which is captured through the CCD 12 and the CDS circuit 16, is signal-processed and is directly applied to the LCD 30 without being stored in the image memory 22. In this case, an image signal of one field is read from the CCD 12. The CDS circuit 16 converts the image signal into the RGB digital video signal, and the signal processing circuit 18 signal-processes the RGB digital video signal, and the RGB digital signal is applied as the video signal to the LCD drive circuit 28 through the video output circuit 24. In accordance with the video signal, the LCD drive circuit 28 applies the RGB video signal and the drive pulses to the LCD 30 in order to display the image on the LCD 30.

Thereafter, the read out of the image signal from the CCD 12, the apply of at least a part of the drive pulses, and the drive of the LCD 30 are suspended for a predetermined period. The image displayed on the LCD 30 is maintained even if the LCD 30 is not driven. After the predetermined period, the read out of the image signal from the CCD 12, the apply of the drive pulses, and the drive of the LCD 30 are resumed to update the displayed image on the LCD 30.

The CPU 20 stops the CCD 12, the CCD drive circuit 13, the CDS circuit 16 and the signal processing circuit 18 during no image signal is read. This remarkably reduces the consumption of electricity. For example, if the image signal is usually read from the CCD 12 at 1/60 sec, the image signal is read and the LCD 30 is driven intermittently at 1/30 sec (the image signal is decreased to 1/2) or at 1/15 sec (the image signal is decreased to 1/4) to display the image. In this case, the moving image cannot be displayed smoothly, but the LCD 30 can satisfactorily serve as the electronic finder.

On the other hand, the video output terminal 26 must output the standard (not intermittent) video signal of NTSC, etc. Then, if the video output terminal connects to the cable or the television, the video output circuit 24 stops outputting the intermittent video signal and outputs the continuous video signal. More specifically, when the CPU 20 receives a signal representing the connection between the video output terminal 26 and the cable, the television, or the like, from the detector 34; the CPU 20 operates the CCD 12, the CCD drive circuit 13, the CDS circuit 16 and the signal processing circuit 18 continuously, not intermittently. Thus, the video output circuit 24 outputs the standard video signal so that the television, etc. can operate normally.

A description will now be given of the third embodiment of the present invention. In the first and second embodiments, the image signal is read from the CCD 12 or the image memory 22 intermittently or continuously, and the LCD 30 is correspondingly driven intermittently or continuously to display the image thereon. In the third embodiment, the image signal is read from the CCD 12 or the image memory 22 with at least two kinds of timing signals. The first timing signal is suitable for generating the standard video signal of NTSC, etc., and the second timing signal has a lower frequency than the first timing signal.

When the standard video signal is outputted through the video output terminal 26, the image signal is read from the CCD 12 or the image memory 22 with the first timing signal. When only the display on the LCD 30 is performed, the image signal is read from the CCD 12 or the image memory 22 with the second timing signal, and a video signal with a lower frame rate than the standard video signal is applied to the LCD 30, which is driven with drive pulses corresponding to the video signal with the lower frame rate.

More specifically, the CPU 20 determines whether the standard video signal should be outputted through the video output terminal 26 or only the display on the LCD 30 should be performed, with the detector 34 or another selector. If the standard video signal output is selected, the CPU 20 outputs a command to the timing signal generating circuit 14 to generate the first timing signal for generating the standard video signal. If the display on the LCD 30 is selected, the CPU 20 outputs a command to the timing signal generating circuit 14 to generate the second timing signal for generating the video signal for the LCD 30.

Consequently, the timing signal generating circuit 14 outputs the first timing signal suitable for generating the standard video signal, or outputs the second timing signal for generating the video signal with the lower frame rate than the standard video signal.

The lower the frequency at which the CCD 12 is driven and the image data is read from the image memory 22, the less the electricity is consumed. When only the display on the LCD 30 is performed, there is no necessity of generating the standard video signal, and thus, the video signal with the lower frame rate than the standard video signal is generated to reduce the consumption of electricity in the third embodiment.

In the above-descried embodiments, the LCD drive circuit 28 does not necessarily receive the video signal of NTSC, etc., but it may receive the RGB signal.

In the above-descried embodiments, the display unit does not necessarily comprise the LCD, but it may comprise another display capable of temporally maintaining the currently-displayed image without receiving the video signal and/or the drive pulses.

As set forth hereinabove, the video signal is intermittently applied to the LCD. During no video signal is applied, the drive pulses for the LCD are not generated and applied to the LCD, and the LCD can continue displaying the currently-displayed image. It is therefore possible to suspend the driving of the imaging device, the read of the image data from the image memory and the operation of the signal processing circuit during no video signal is applied. This significantly reduces the consumption of electricity. Suspending the driving of the LCD has no problem if the LCD shows the still image. If the LCD shows the moving image, the moving image is displayed intermittently and cannot be displayed smoothly, but the LCD can satisfactorily serve as the electronic finder.

The image data does not always have to be read from the image memory, etc. For this reason, it is possible to access the image memory while no data is read for the display while the image is displayed on the LCD, thereby securing enough time to perform other signal processing (e.g., compressing the image data and recording the image data in the external storage medium). Consequently, the signal processing can be performed at a high speed.

To output the video signal to the external equipment, the imaging device is driven or the image data is read from the image memory with the first timing signal suitable for generating the standard video signal. On the other hand, to display the image on the LCD, the imaging device is driven or the image data is read from the image memory with the second timing signal of the lower frequency than the first timing signal, since it is unnecessary to confirm the format of the standard video signal. This reduces the consumption of electricity during the display of the image on the LCD.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A display apparatus comprising:

a display unit;

a video signal generator for intermittently outputting a video signal; and a display unit driver for intermittently receiving the video signal from the video signal generator and applying the video signal and drive pulses to the display unit;

wherein, while the display unit driver does not receive the video signal from the video signal generator, the display unit driver suspends applying of at least a part of the drive pulses to the display unit and maintains a currently-displayed image on the display unit.

2. The display apparatus as defined in claim 1, wherein the display unit comprises a liquid crystal display.

3. An electronic camera comprising:

an imaging device for converting light from a subject into an image signal;

an imaging unit for obtaining image data representing the subject by driving the imaging device;

a display unit;

a video signal generator for controlling the imaging unit to intermittently drive the imaging device, intermittently converting the image data obtained through the imaging device and the imaging unit into a video signal, and intermittently outputting the video signal; and a display unit driver for intermittently receiving the video signal from the video signal generator and applying the video signal and drive pulses to the display unit;

wherein, while the display unit driver does not receive the video signal from the video signal generator, the display unit driver suspends applying of at least a part of the drive pulses to the display unit and maintains a currently-displayed image on the display unit.

4. The electronic camera as defined in claim 3, wherein the display unit comprises a liquid crystal display.

5. An electronic camera comprising:

an imaging device for converting light from a subject into an image signal;

an imaging unit for obtaining image data representing the subject by driving the imaging device;

an image memory for storing the image data;

a display unit;

a video signal generator for intermittently reading the image data from the image memory, intermittently converting the image data read from the image memory into a video signal, and intermittently outputting the video signal; and a display unit driver for intermittently receiving the video signal from the video signal generator and applying the video signal and drive pulses to the display unit;

wherein, while the display unit driver does not receive the video signal from the video signal generator, the display unit driver suspends applying of at least a part of the drive pulses to the display unit and maintains a currently-displayed image on the display unit.

6. The electronic camera as defined in claim 5, wherein the display unit comprises a liquid crystal display.

7. The electronic camera as defined in claim 5, further comprising a signal processor for accessing the image memory to perform a signal processing while the video signal generator does not read the image data from the image memory.

8. The electronic camera as defined in claim 7, wherein the signal processor performs the signal processing including recording the image data stored in the image memory into a storage medium.

9. An electronic camera comprising:

an imaging device for converting light from a subject into an image signal;

an imaging unit for obtaining image data representing the subject by driving the imaging device;

an image memory for storing the image data;

a display unit;

a video signal generator for intermittently reading the image data from the image memory, intermittently converting the image data read from the image memory into a video signal, and intermittently outputting the video signal, the video signal generator being capable of continuously reading the image data from the image memory, continuously converting the image data read from the image memory into the video signal, and continuously outputting the video signal;

a signal processor for accessing the image memory to perform a signal processing while the video signal generator does not read the image data from the image memory; and a display unit driver for intermittently receiving the video signal from the video signal generator and applying the video signal and drive pulses to the display unit;

wherein, while the display unit driver does not receive the video signal from the video signal generator, the display unit driver suspends applying of at least a part of the drive pulses to the display unit and maintains a currently-displayed image on the display unit.

10. The electronic camera as defined in claim 9, wherein the display unit comprises a liquid crystal display.

11. The electronic camera as defined in claim 9, further comprising:

a video output terminal for operatively connecting to an external device, the video signal outputted from the video signal generator being outputted to the external device through the video output terminal; and a detector for detecting the video output terminal operatively connecting the external device;

wherein, when the detector detects the video output terminal operatively connecting the external device, the video signal generator continuously reads the image data from the image memory, continuously converts the image data read from the image memory into the video signal, and continuously outputs the video signal.

12. The electronic camera as defined in claim 9, wherein:

the signal processor performs the signal processing including recording the image data stored in the image memory into a storage medium; and the video signal generator intermittently reads the image data from the image memory since a release of the electronic camera is operated until the image data is recorded in the storage medium.

13. An electronic camera comprising:

an imaging device for converting light from a subject into an image signal;

an imaging unit for obtaining image data representing the subject by driving the imaging device;

a display unit;

a video output terminal for operatively connecting to an external device;

a selector for selecting one of a first mode to output a first video signal to the external device through the video output terminal and a second mode to display an image represented with the image data on the display unit;

a timing signal generator for generating, in the first mode, a first timing signal to generate the first video signal, and generating, in the second mode, a second timing signal with a lower frequency than the first timing signal;

a video signal generator for, in the first mode, controlling the imaging unit to drive the imaging device with the first timing signal, converting the image data obtained through the imaging device and the imaging unit into the first video signal, and outputting the first video signal; and a display unit driver for, in the second mode, controlling the imaging unit to drive the imaging device with the second timing signal, converting the image data obtained through the imaging device and the imaging unit into a second video signal, and applying the second video signal and drive pulses to the display unit.

14. The electronic camera as defined in claim 13, wherein the display unit comprises a liquid crystal display.

15. An electronic camera comprising:

an imaging device for converting light from a subject into an image signal;

an imaging unit for obtaining image data representing the subject by driving the imaging device;

an image memory for storing the image data;

a display unit;

a video output terminal for operatively connecting to an external device;

a selector for selecting one of a first mode to output a first video signal to the external device through the video output terminal and a second mode to display an image represented with the image data on the display unit;

a timing signal generator for generating, in the first mode, a first timing signal to generate the first video signal, and generating, in the second mode, a second timing signal with a lower frequency than the first timing signal;

a video signal generator for, in the first mode, reading the image data from the image memory with the first timing signal, converting the image data read from the image memory into the first video signal, and outputting the first video signal; and a display unit driver for, in the second mode, reading the image data from the image memory with the second timing signal, converting the image data read from the image memory into a second video signal, and applying the second video signal and drive pulses to the display unit.

16. The electronic camera as defined in claim 15, wherein the display unit comprises a liquid crystal display.

17. The electronic camera as defined in claim 15, further comprising a signal processor for, in the second mode, accessing the image memory to perform a signal processing while the display unit driver does not read the image data from the image memory.

18. The electronic camera as defined in claim 17, wherein the signal processor performs the signal processing including recording the image data stored in the image memory into a storage medium.

* * * * *